(12) United States Patent
Kondo et al.

(10) Patent No.: US 11,480,223 B2
(45) Date of Patent: Oct. 25, 2022

(54) AERODYNAMIC NOISE REDUCTION MEMBER, RAILROAD VEHICLE BRAKE DISK UNIT, RAILROAD VEHICLE DISK BRAKE, RAILROAD VEHICLE WHEEL, AND RAILROAD VEHICLE

(71) Applicant: NIPPON STEEL CORPORATION, Tokyo (JP)

(72) Inventors: Osamu Kondo, Tokyo (JP); Takahiro Fujimoto, Tokyo (JP); Takanori Kato, Tokyo (JP); Atsushi Sakaguchi, Tokyo (JP); Yuki Ichikawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 110 days.

(21) Appl. No.: 17/044,594

(22) PCT Filed: Apr. 2, 2019

(86) PCT No.: PCT/JP2019/014702
§ 371 (c)(1),
(2) Date: Oct. 1, 2020

(87) PCT Pub. No.: WO2019/194203
PCT Pub. Date: Oct. 10, 2019

(65) Prior Publication Data
US 2021/0025465 A1 Jan. 28, 2021

(30) Foreign Application Priority Data
Apr. 3, 2018 (JP) .............................. JP2018-071242

(51) Int. Cl.
*F16D 65/12* (2006.01)
*F16D 65/00* (2006.01)
(Continued)

(52) U.S. Cl.
CPC ........... *F16D 65/0006* (2013.01); *B61H 5/00* (2013.01); *F16D 65/123* (2013.01); *F16D 65/128* (2013.01); *F16D 2065/1392* (2013.01)

(58) Field of Classification Search
CPC ...................... F16D 65/12; F16D 65/123–128
(Continued)

(56) References Cited

U.S. PATENT DOCUMENTS 8,794,398 B2 * 8/2014 Fujimoto ................ F16D 65/12
188/71.6
10,704,625 B2 * 7/2020 Shiraishi .................. B61H 5/00
(Continued)

FOREIGN PATENT DOCUMENTS

JP 2007205428 A 8/2007
JP 2008291877 A 12/2008
(Continued)

*Primary Examiner* — Christopher P Schwartz
(74) *Attorney, Agent, or Firm* — Greer Burns & Crain Ltd.

(57) ABSTRACT

An aerodynamic noise reduction member 30 includes: a plate-like support portion 32 sandwiched between a plurality of fins 24 and 26 of a brake disk 20 and a rotating member 102 of a railroad vehicle; and a plurality of protruding portions 34 protruding from the support portion 32. Each of the plurality of protruding portions 34 is provided in such a manner that, in a state in which the support portion 32 is sandwiched between the plurality of fins 24 and 26 and the rotating member 102, each of the protruding portions 34 partially occludes between the fastening fin 24 and the anchoring fin 26 adjacent to each other in a circumferential direction of the brake disk 20.

11 Claims, 9 Drawing Sheets

(51) Int. Cl.
*B61H 5/00* (2006.01)
*F16D 65/02* (2006.01)

(58) Field of Classification Search
USPC .................. 188/18 A, 218 A, 218 R, 218
See application file for complete search history.

(56) References Cited

U.S. PATENT DOCUMENTS

| | | |
|---|---|---|
| 2011/0214950 A1 | 9/2011 | Fujimoto et al. |
| 2019/0178317 A1 | 6/2019 | Shiraishi et al. |

FOREIGN PATENT DOCUMENTS

| | | |
|---|---|---|
| WO | 2010071169 A1 | 6/2010 |
| WO | 2017099074 A1 | 6/2017 |

* cited by examiner

AERODYNAMIC NOISE REDUCTION MEMBER, RAILROAD VEHICLE BRAKE DISK UNIT, RAILROAD VEHICLE DISK BRAKE, RAILROAD VEHICLE WHEEL, AND RAILROAD VEHICLE

This is a National Phase Application filed under 35 U.S.C. § 371, of International Application No. PCT/JP2019/014702, filed Apr. 2, 2019, the contents of which are incorporated by reference.

TECHNICAL FIELD

The present invention relates to an aerodynamic noise reduction member for reducing an aerodynamic noise generated in a disk brake of a railroad vehicle, and a brake disk unit, a disk brake, a wheel and a railroad vehicle that are provided with the aerodynamic noise reduction member.

BACKGROUND ART

Disk brakes have been used for railroad vehicles such as the Shinkansen bullet train. Such a disk brake is provided with, for example, an annular brake disk fixed to a disk-shaped rotating member (disk-like object fixed to a wheel or to an axle separately from the wheel) rotated integrally with an axle, a brake lining with a friction member, and a brake caliper for moving the brake lining.

In the disk brake configured as described above, a braking force can be generated by moving the brake lining by the brake caliper to press the friction member of the brake lining against a surface (sliding surface) of the brake disk. In this way, the railroad vehicle can be decelerated.

While a railroad vehicle is traveling, the brake disk is rotated with the wheel at high speed. High-speed rotation of the brake disk causes air around the brake disk to be sucked from an inner circumference side of the brake disk between the rotating member (such as a wheel) and the brake disk, and thereafter discharged from an outer circumference side of the brake disk. Consequently, while the railroad vehicle is traveling, air is caused to flow between the brake disk and the rotating member at high speed.

The brake disk can be cooled by the air flow during braking. On the other hand, when the railroad vehicle is traveling at a speed over 300 km per hour, there arises a problem of a noise (hereinafter referred to as an aerodynamic noise) being generated due to the high-speed air flow. As such, to solve the problem, the present inventors have proposed a brake disk with which an aerodynamic noise can be reduced (for example, see Patent Document 1).

Figure 12:
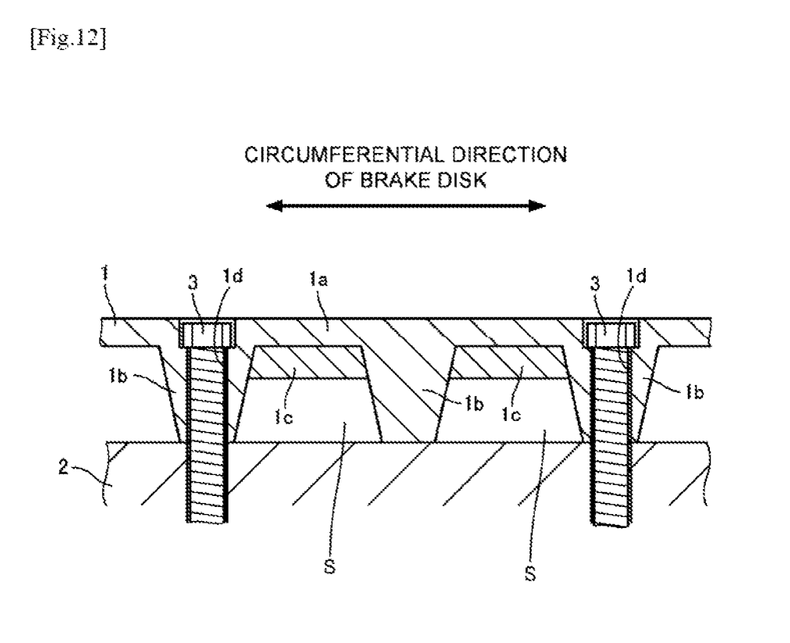
FIG. 12 is a schematic view of a known brake disk.

FIG. 12 is a sectional view illustrating a brake disk disclosed in Patent Document 1. A brake disk 1 illustrated in FIG. 12 includes a plate portion 1a that has a surface (sliding surface) against which a brake lining (not illustrated) is pressed, a plurality of fin portions 1b provided on a back side (the side of a wheel 2) of the plate portion 1a, and a connecting portion 1c for connecting adjacent fin portions 1b. Through holes 1d adapted for fastening are formed in a predetermined number of fin portions 1b of the plurality of fin portions 1b. Bolts 3 are inserted through the through holes 1d to attach the brake disk 1 to the wheel 2.

In the above configuration, when the brake disk 1 and the wheel 2 are rotated, air around the brake disk 1 is to be sucked from the inner circumference side of the brake disk 1 into a space S (space surrounded by a plate portion 1a, adjacent fin portions 1b, and the wheel 2), and after passing through the space S, discharged from the outer circumference side of the brake disk 1.

Here, in the brake disk 1 of Patent Document 1, a sectional area of the space S can be partially reduced by the connecting portion 1c. In this way, air flow is restrained and thus, aerodynamic noise is reduced.

LIST OF PRIOR ART DOCUMENTS

Patent Document

Patent Document 1: JP2007-205428A

SUMMARY OF INVENTION

Technical Problem

In the brake disk 1 disclosed in Patent Document 1, it is necessary to provide the connecting portion 1c to connect the fin portions 1b on the back surface of the plate portion 1a. Accordingly, it is necessary in the brake disk 1 of Patent Document 1 to form the plate portion 1a, the fin portions 1b, and the connecting portion 1c integrally.

However, as a result of research conducted by the present inventors, it has been found that in a case where the plate portion 1a, the fin portions 1b, and the connecting portion 1c are integrally formed, the plate portion 1a may be likely to be warped. Specifically, in a case where the plate portion 1a, the fin portions 1b, and the connecting portion 1c are integrally formed, the vicinities of the connecting portion 1c in the brake disk 1 have a higher rigidity than that of the remaining portions. Consequently, when the brake disk 1 is heated to a high temperature during braking, the remaining portions are more likely to be deformed than the vicinities of the connecting portion 1c in the brake disk 1. As a result, the plate portion 1a is likely to be warped. When the plate portion 1a is warped, the bolt 3 experiences a bending stress. Accordingly, when the configuration of Patent Document 1 is to be adopted, it is necessary to suitably design the brake disk 1 in consideration of factors such as shape and rigidity of the integrally-formed plate portion 1a, fin portions 1b and connecting portion 1c in such a manner that bending in the plate portion 1a can be restrained. In other words, when the configuration of Patent Document 1 is to be adopted, the design for restraining warpage in the plate portion 1a is not straightforward.

An object of the present invention is to provide an aerodynamic noise reduction member that facilitates the design of the railroad vehicle brake disk and is capable of restraining an aerodynamic noise from being generated, and a railroad vehicle brake disk unit, a railroad vehicle disk brake, a railroad vehicle wheel, and a railroad vehicle that are provided with the aerodynamic noise reduction member.

Solution to Problem

The gist of the present invention is an aerodynamic noise reduction member, a railroad vehicle brake disk unit, a railroad vehicle disk brake, a railroad vehicle wheel, and a railroad vehicle as described below.

(1) An aerodynamic noise reduction member to be provided between a railroad vehicle brake disk and a disk-shaped rotating member rotated integrally with an axle of a railroad vehicle, the railroad vehicle brake disk including: an annular plate-like portion that has a sliding surface on a first side in a thickness direction; and a plurality of fins protruding from the plate-like portion toward a second side in the thickness direction, the plurality of fins being provided in a spaced apart manner in a circumferential direction of the plate-like portion, the aerodynamic noise reduction member including:

a plate-like support portion to be sandwiched between the plurality of fins and the rotating member; and a plurality of protruding portions protruding from the support portion in a thickness direction of the support portion, wherein in a state in which the support portion is sandwiched between the plurality of fins and the rotating member, each of the plurality of protruding portions partially occludes between adjacent ones of the fins in the circumferential direction.

(2) The aerodynamic noise reduction member according to (1), wherein the plurality of fins include a fastening fin that has a first through hole into which a fastening member is to be inserted, and the support portion has a second through hole that faces the first through hole in a state in which the support portion is sandwiched between the plurality of fins and the rotating member.

(3) The aerodynamic noise reduction member according to (1) or (2), wherein the plurality of fins include an anchoring fin that has a key way recessed from an end portion on the second side in the thickness direction of the plate-like portion toward the first side, and the support portion has a third through hole that faces the key way in a state in which the support portion is sandwiched between the plurality of fins and the rotating member.

(4) The aerodynamic noise reduction member according to any one of (1) to (3), wherein in a radial direction of the plate-like portion, a length of each of the plurality of protruding portions is shorter than a length of each of the plurality of fins.

(5) The aerodynamic noise reduction member according to any one of (1) to (4), wherein the support portion has a ring shape, and a number of the plurality of protruding portions is equal to that of the plurality of fins.

(6) The aerodynamic noise reduction member according to any one of (1) to (5), wherein in a state in which the support portion is sandwiched between the plurality of fins and the rotating member, each of the plurality of protruding portions protrudes from the support portion to a side of the plate-like portion in such a manner that a gap is formed between the protruding portions and the plate-like portion.

(7) The aerodynamic noise reduction member according to (6), wherein in a section orthogonal to the circumferential direction of the plate-like portion, a leading end portion of each of the protruding portions is curved or inclined outward with respect to an axial direction of the rotating member in a radial direction of the plate-like portion.

(8) A railroad vehicle brake disk unit including:

a railroad vehicle brake disk including an annular plate-like portion that has a sliding surface on a first side in a thickness direction, and a plurality of fins protruding from the plate-like portion toward a second side in the thickness direction, the plurality of fins being provided in a mutually spaced apart manner in a circumferential direction of the plate-like portion; and the aerodynamic noise reduction member according to any one of (1) to (7).

(9) A railroad vehicle disk brake including the railroad vehicle brake disk unit according to (8).

(10) A railroad vehicle wheel including the railroad vehicle brake disk unit according to (8).

(11) A railroad vehicle including the railroad vehicle disk brake according to (9).

Advantageous Effects of Invention

According to the present invention, it is possible to facilitate the design of the railroad vehicle brake disk and restrain an aerodynamic noise from being generated.

DESCRIPTION OF EMBODIMENTS

An aerodynamic noise reduction member, a railroad vehicle brake disk unit, and a railroad vehicle disk brake according to an embodiment of the present invention will now be described with reference to drawings. Although not described in detail, the disk brake according to the embodiment described herein may be used in a variety of railroad vehicles.

Figure 1:
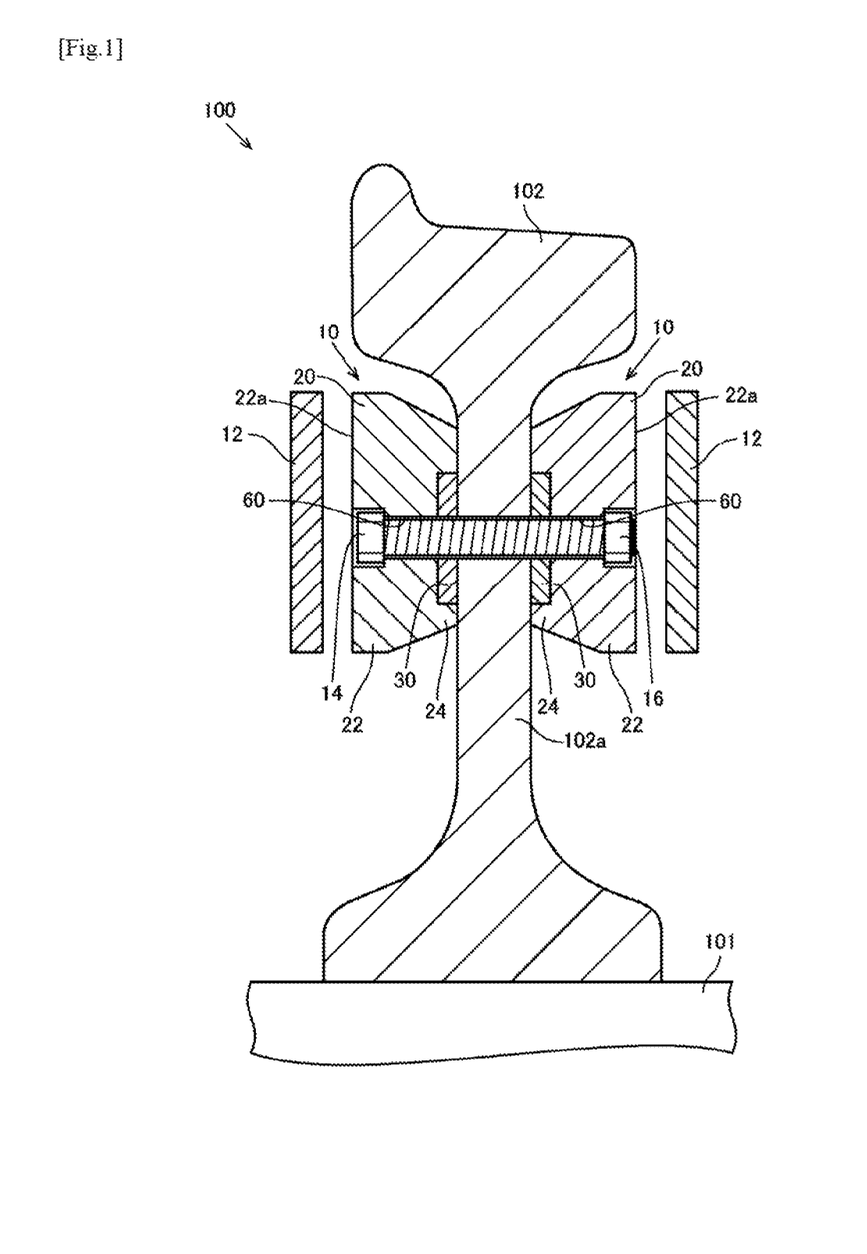
FIG. 1 is a schematic view illustrating a railroad vehicle disk brake provided with a brake disk unit according to an embodiment.
Figure 2:
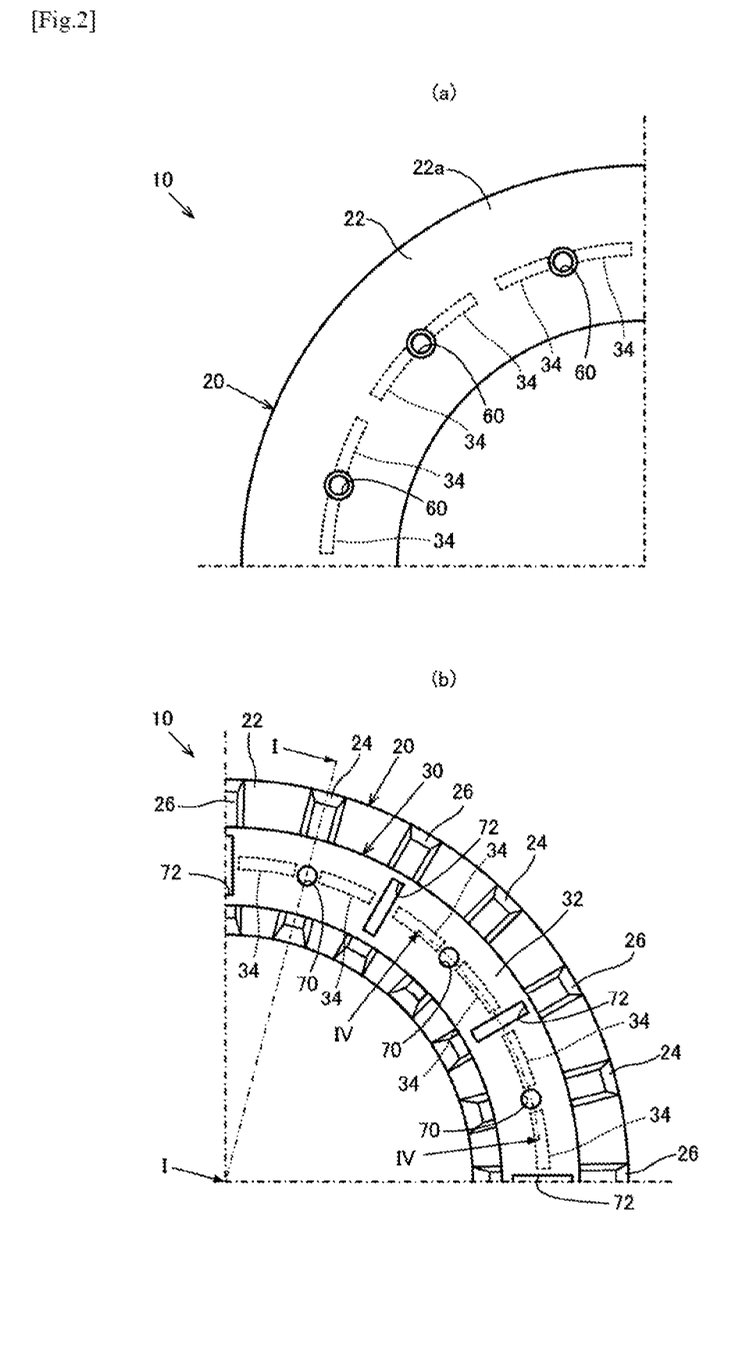
FIG. 2 shows schematic views illustrating the brake disk unit.
Figure 3:
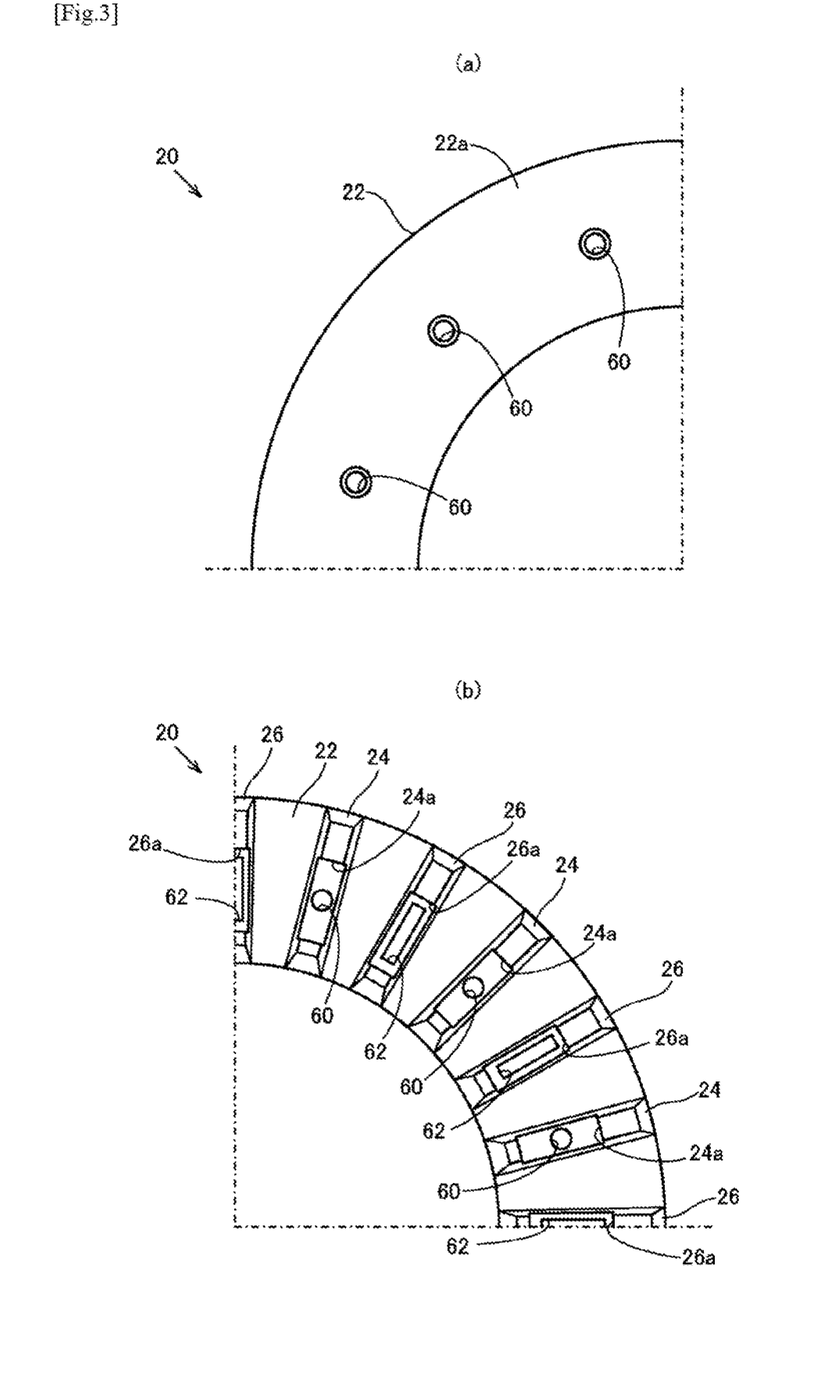
FIG. 3 shows schematic views illustrating the brake disk.
Figure 4:
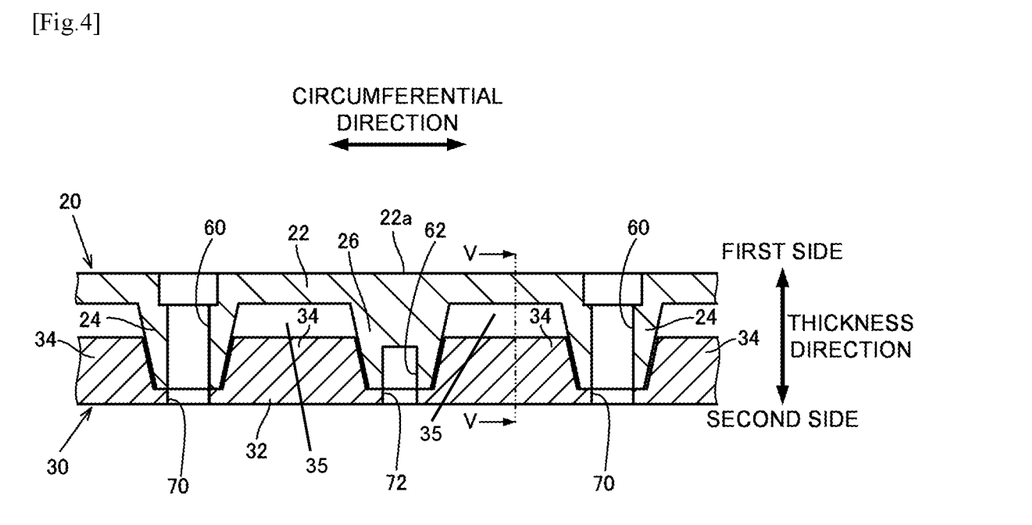
FIG. 4 is a schematic sectional view corresponding to a section taken along a line IV-IV in FIG. 2.
Figure 5:
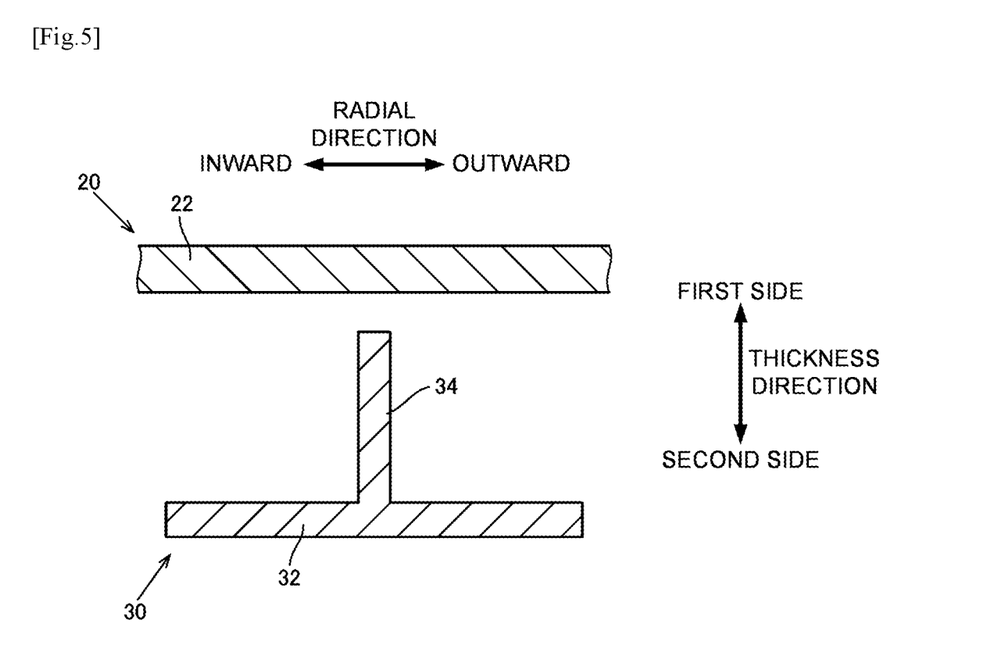
FIG. 5 is a schematic sectional view corresponding to a section taken along a line V-V in FIG. 4.

FIG. 1 is a schematic view illustrating a railroad vehicle disk brake provided with a brake disk unit according to an embodiment, FIG. 2 shows schematic views illustrating the brake disk unit, and FIG. 3 shows schematic views illustrating the brake disk. FIG. 4 is a schematic sectional view corresponding to a section taken along a line IV-IV in FIG. 2. FIG. 5 is a schematic sectional view corresponding to a section taken along a line V-V in FIG. 4. In FIG. 1, a section of the brake disk unit corresponding to a section taken along a line I-I in FIG. 2(*b*). In FIG. 2, the view (a) is a front view illustrating a ¼ region in a circumferential direction of the brake disk unit, and the view (b) is a back view illustrating a ¼ region in the circumferential direction of the brake disk unit. In FIG. 3, the view (a) is a front view illustrating a ¼ region in a circumferential direction of the brake disk, and the view (b) is a back view illustrating a ¼ region in the circumferential direction of the brake disk.

With reference to FIG. 1, a railroad vehicle disk brake 100 (hereinafter abbreviated as a disk brake 100) is provided with a pair of brake disk units 10 and a pair of brake linings 12. The pair of brake disk units 10 is attached to a disk-shaped rotating member 102 fixed to an axle 101 of a railroad vehicle in such a manner that a circular plate portion 102*a* of the rotating member 102 is sandwiched between the brake disk units 10. The brake disk unit 10 and the rotating member 102 are integrally rotatable with the axle 101 and provided coaxially with the axle 101. In the embodiment, the rotating member 102 is a wheel. Accordingly, in the embodiment, the brake disk unit 10 is a brake disk unit of a wheel-mounted brake disk type attached to the wheel. Hereinafter, the rotating member 102 is referred to as a wheel 102. The paired brake linings 12 are provided outside of the pair of brake disk units 10 in an axial direction of the wheel 102.

Each of the brake disk units 10 is provided with a brake disk 20 and an aerodynamic noise reduction member 30. Both of the brake disk 20 and the aerodynamic noise reduction member 30 have an annular shape. The aerodynamic noise reduction member 30 is provided between the brake disk 20 and the wheel 102 (circular plate portion 102a). The pair of brake disk units 10 is fixed to the wheel 102 by a plurality of fastening members (in the embodiment, a plurality of bolts 14 and a plurality of nuts 16).

In the disk brake 100 according to the embodiment, the brake lining 12 can be moved in an axial direction of the wheel 102 by a brake caliper, which is not illustrated. In this way, the brake lining 12 (friction member) can be pressed against a sliding surface 22a described later of the brake disk 20 to generate a braking force. Note that the wheel 102, the brake lining 12, and the brake caliper may be implemented by using any known variety of wheels, brake linings, and brake calipers, and thus are not described in detail.

With reference to FIGS. 1 to 4, the brake disk 20 includes a plate-like portion 22, a plurality of fastening fins 24, and a plurality of anchoring fins 26.

The plate-like portion 22 has an annular shape. The plate-like portion 22 has an annular sliding surface 22a on a first side in a thickness direction. The sliding surface 22a is formed substantially in a perpendicular manner to an axial direction of the brake disk 20. The sliding surface 22a is a surface against which the brake lining 12 is pressed to generate a braking force in the disk brake 100. In the description below, the thickness direction of the plate-like portion 22 is simply referred to as a thickness direction.

Both of the fastening fin 24 and the anchoring fin 26 protrude from the plate-like portion 22 toward a second side in the thickness direction. Both of the fastening fin 24 and the anchoring fin 26 function as a heat radiating portion. In the embodiment, the plurality of fastening fins 24 and the plurality of anchoring fins 26 are formed in such a manner that the fins extend radially with respect to the center of the brake disk 20 when viewed from the thickness direction. In other words, both of the plurality of fastening fins 24 and the plurality of anchoring fins 26 are formed in such a manner that the fins extend in a radial direction of the plate-like portion 22 when viewed from the thickness direction. In the description below, the radial direction of the plate-like portion 22 is simply referred to as a radial direction.

In the embodiment, the plurality of fastening fins 24 and the plurality of anchoring fins 26 are arranged alternately in a spaced apart manner in the circumferential direction of the plate-like portion 22. In the embodiment, 12 fastening fins 24 and 12 anchoring fins 26 are alternately arranged. The number of the fastening fins 24 and the anchoring fins 26 is not limited to the above example, and the number of either the fastening fins 24 or the anchoring fins 26 may be less than 12 or may be 13 or more. In the description below, the circumferential direction of the plate-like portion 22 is simply referred to as a circumferential direction.

With reference to FIG. 3(b), at an end portion on the second side (wheel 102 side) in the thickness direction in each of the fastening fins 24, a recess 24a is formed for fitting a support portion 32, which will be described later, of the aerodynamic noise reduction member 30 (see FIG. 2). Further, at an end portion on the second side (wheel 102 side) in the thickness direction in each of the anchoring fins 26, a recess 26a is formed for fitting the support portion 32, which will be described later.

With reference to FIGS. 2 to 4, a plurality of first through holes 60 extending through the brake disk 20 in the thickness direction are formed in a spaced apart manner in the circumferential direction. The first through holes 60 are formed in such a manner that each first through hole 60 passes through each of the fastening fins 24. A fastening member (a bolt 14 in the embodiment) for fixing the brake disk 20 to the wheel 102 is inserted into the first through hole 60.

With reference to FIGS. 3 and 4, a key way 62 is formed in each of the anchoring fins 26, the key way 62 being recessed from an end portion of the second side in the thickness direction toward the first side in the thickness direction. With reference to FIG. 3(b), in the embodiment, the key way 62 is formed in such a manner that the key way 62 is recessed toward the first side beyond the recess 26a. A key (not illustrated) attached to the wheel 102 is to be fitted into the key way 62. In this way, in the circumferential direction, the brake disk 20 and the wheel 102 are engaged with each other via the key. Note that the key and the configuration for attaching the key to the wheel 102 may be implemented by using any known variety of configurations and thus are not described in detail.

With reference to FIGS. 2, 4, and 5, the aerodynamic noise reduction member 30 includes a plate-like support portion 32 and a plurality of protruding portions 34 protruding from the support portion 32 in the thickness direction of the support portion 32. In the embodiment, the support portion 32 has a ring shape. More specifically, the support portion 32 has an annular shape as with the plate-like portion 22. In the embodiment, in a state in which the support portion 32 is fitted in the recess 24a of each of the fastening fins 24 (see FIG. 3(b)) and the recess 26a of each of the anchoring fins 26 (see FIG. 3(b)), the support portion 32 is sandwiched between the plurality of fins 24 and 26 and the wheel 102.

With reference to FIGS. 2 and 4, a plurality of second through holes 70 and a plurality of third through holes 72 are formed in the support portion 32. The plurality of second through holes 70 are formed in such a manner that the second through holes 70 face the plurality of first through holes 60 in a state in which the support portion 32 is sandwiched between the plurality of fins 24 and 26 and the wheel 102. Further, the plurality of third through holes 72 are formed in such a manner that the third through holes 72 face the plurality of key ways 62 in a state in which the support portion 32 is sandwiched between the plurality of fins 24 and 26 and the wheel 102. With the configuration described above, the fastening member (a bolt 14 in the embodiment) for fixing the brake disk 20 to the wheel 102 can be inserted into the second through hole 70. Further, a key (not illustrated) for engaging the brake disk 20 with the wheel 102 can be inserted into the third through hole 72. As a result, the aerodynamic noise reduction member 30 can be easily and suitably attached to the brake disk 20 and the wheel 102.

The plurality of protruding portions 34 are provided in a spaced apart manner in the circumferential direction of the support portion 32. Each of the plurality of protruding portions 34 is provided in such a manner that, in a state in which the support portion 32 is sandwiched between the plurality of fins 24 and 26 and the wheel 102, the protruding portions 34 partially occludes between adjacent ones of the fins in the circumferential direction. In the embodiment, each of the protruding portions 34 is provided in such a manner that the protruding portion 34 partially occludes between the fastening fin 24 and the anchoring fin 26 adjacent to each other. In the embodiment, the number of the plurality of protruding portions 34 is equal to that of the plurality of fins 24 and 26 (total of the plurality of fastening fins 24 and the plurality of anchoring fins 26).

In the embodiment, in the radial direction of the plate-like portion 22, the length of the plurality of protruding portions 34 is shorter than that of the plurality of fins 24 and 26. Accordingly, it is possible to reduce weight of the aerodynamic noise reduction member 30.

With reference to FIGS. 4 and 5, each of the plurality of protruding portions 34 is provided in such a manner that each of the protruding portions 34 protrudes from the support portion 32 toward the plate-like portion 22. In the embodiment, in a state in which the support portion 32 is sandwiched between the plurality of fins 24 and 26 and the wheel 102 (see FIG. 1), a gap 35 is formed between the plurality of protruding portions 34 and the plate-like portion 22. In this way, a gap 35 is formed between the brake disk 20 and the wheel 102, allowing air to flow between the brake disk 20 and the wheel 102. As a result, the brake disk 20 can suitably be cooled during braking. In a section perpendicular to the radial direction of the plate-like portion 22 (section in parallel to the circumferential direction), a total area of the gap 35 between the plurality of protruding portions 34 and the plate-like portion 22 is set, for example, 18000 $mm^2$ or less. Further, the total area is set, for example, 2500 $mm^2$ or more. Note that the total area may be changed as necessary depending on factors such as dimensions, the shape, and the use environment of the disk brake 100.

As described above, in the embodiment, the aerodynamic noise reduction member 30 is provided between the brake disk 20 and the wheel 102. Then, a part of a space between the fastening fin 24 and the anchoring fin 26 adjacent to each other is occluded by each of the plurality of protruding portions 34 of the aerodynamic noise reduction member 30. In this way, air flow between the brake disk 20 and the wheel 102 can be restrained while the railroad vehicle is traveling, so that the aerodynamic noise can be reduced.

In the embodiment, the aerodynamic noise can be restrained by the protruding portion 34 of the aerodynamic noise reduction member 30 formed as a separate component from the brake disk 20. In this case, the protruding portion 34 does not have an effect on rigidity of the brake disk 20, and thus the design of the brake disk 20 is facilitated. In other words, the design for restraining warpage in the plate-like portion 22 is facilitated.

As a result, it is possible to facilitate the design of the brake disk 20 and restrain the aerodynamic noise from being generated in the disk brake 100.

Figure 6:
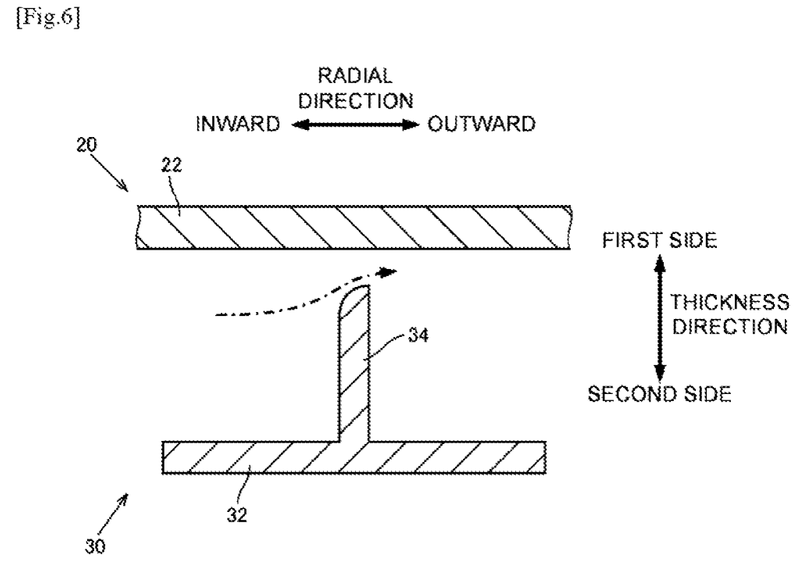
FIG. 6 illustrates a variation of the protruding portion.
Figure 7:
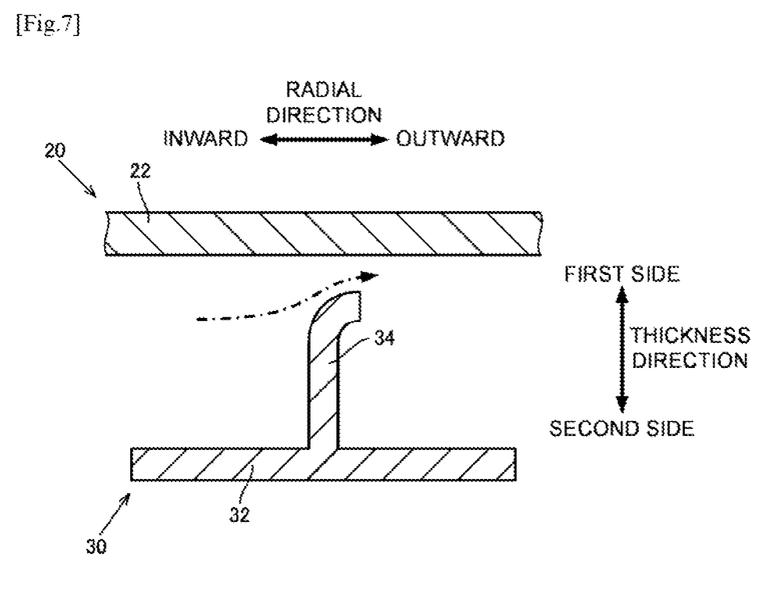
FIG. 7 illustrates a variation of the protruding portion.

The shape of the protruding portion 34 is not limited to the above example. For example, as illustrated in FIGS. 6 and 7, a leading end portion (end portion on the side of the plate-like portion 22) of the protruding portion 34 may be curved radially outward with respect to the axial direction (thickness direction of the support portion 32) of the wheel 102 (see FIG. 1), in a section orthogonal to the circumferential direction of the plate-like portion 22. In this case, while the railroad vehicle is traveling, air can be caused to flow smoothly from inward of the protruding portion 34 to outward of the protruding portion 34 in the radial direction of the plate-like portion 22, as indicated by an arrow with a long dashed short dashed line. Accordingly, the brake disk 20 can efficiently be cooled. Further, a large variation in air flow pressure near the leading end portion of the protruding portion 34 can also be prevented, and thus vibration of the protruding portion 34 can sufficiently be restrained from being generated. In this way, it is possible to sufficiently restrain noises from being generated, as well as to sufficiently restrain degradation of the protruding portion 34.

Figure 8:
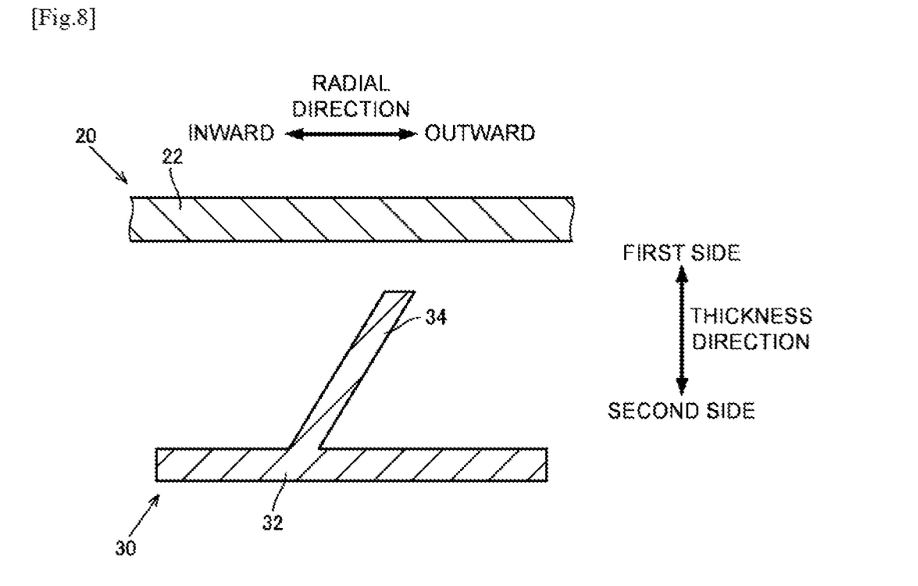
FIG. 8 illustrates a variation of the protruding portion.
Figure 9:
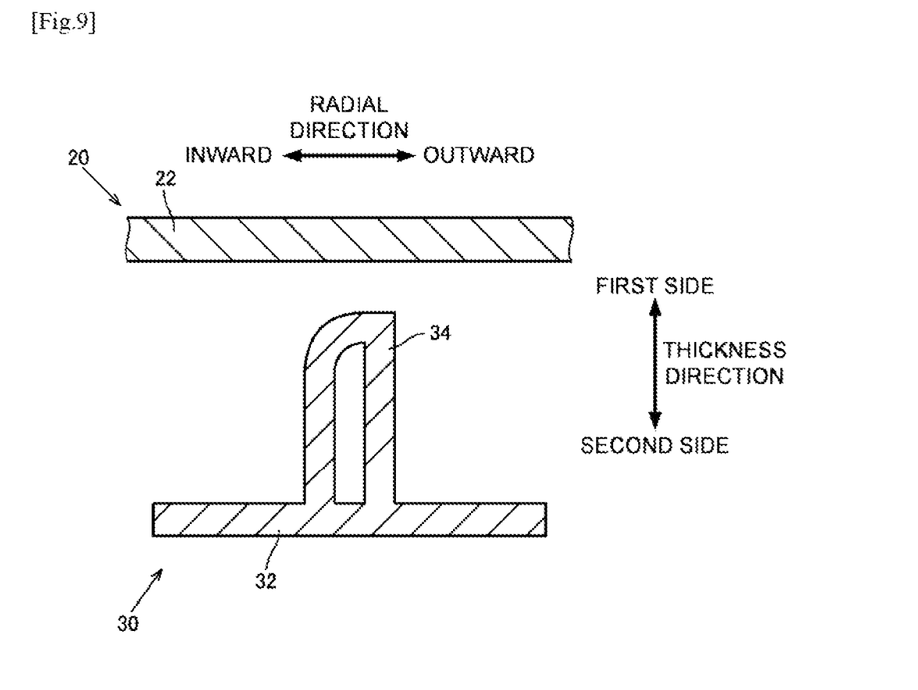
FIG. 9 illustrates a variation of the protruding portion.
Figure 10:
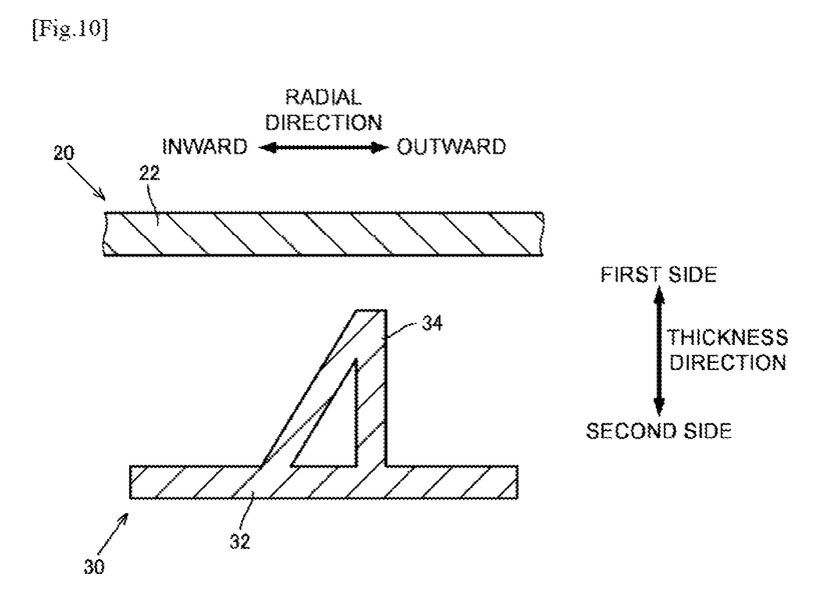
FIG. 10 illustrates a variation of the protruding portion.

As illustrated in FIG. 8, the protruding portion 34 may be inclined radially outward with respect to the axial direction (thickness direction of the support portion 32) of the wheel 102 (see FIG. 1), in a section orthogonal to the circumferential direction of the plate-like portion 22. In this case, similar effects can be produced as with the protruding portions 34 illustrated in FIGS. 6 and 7. Although not described in detail, provided that a radially inward surface of the leading end portion of the protruding portion 34 is curved or inclined radially outward with respect to the axial direction of the wheel 102 in a section orthogonal to the circumferential direction of the plate-like portion 22, similar effects can be produced as with the cases described above. Accordingly, for example, as illustrated in FIGS. 9 and 10, similar effects can be produced as with the protruding portions 34 illustrated in FIGS. 6 to 8 when a dimension of the end portion of the protruding portion 34 in the radial direction (dimension in the radial direction of the plate-like portion 22) on the side of the support portion 32 is increased. In the case of the protruding portions 34 illustrated in FIGS. 9 and 10, rigidity can be improved compared to the protruding portions 34 illustrated in FIGS. 6 to 8, and thus vibration of the protruding portions 34 can more effectively be restrained from being generated. Although a cavity is formed in the protruding portions 34 illustrated in FIGS. 9 and 10, no cavity may be formed.

Figure 11:
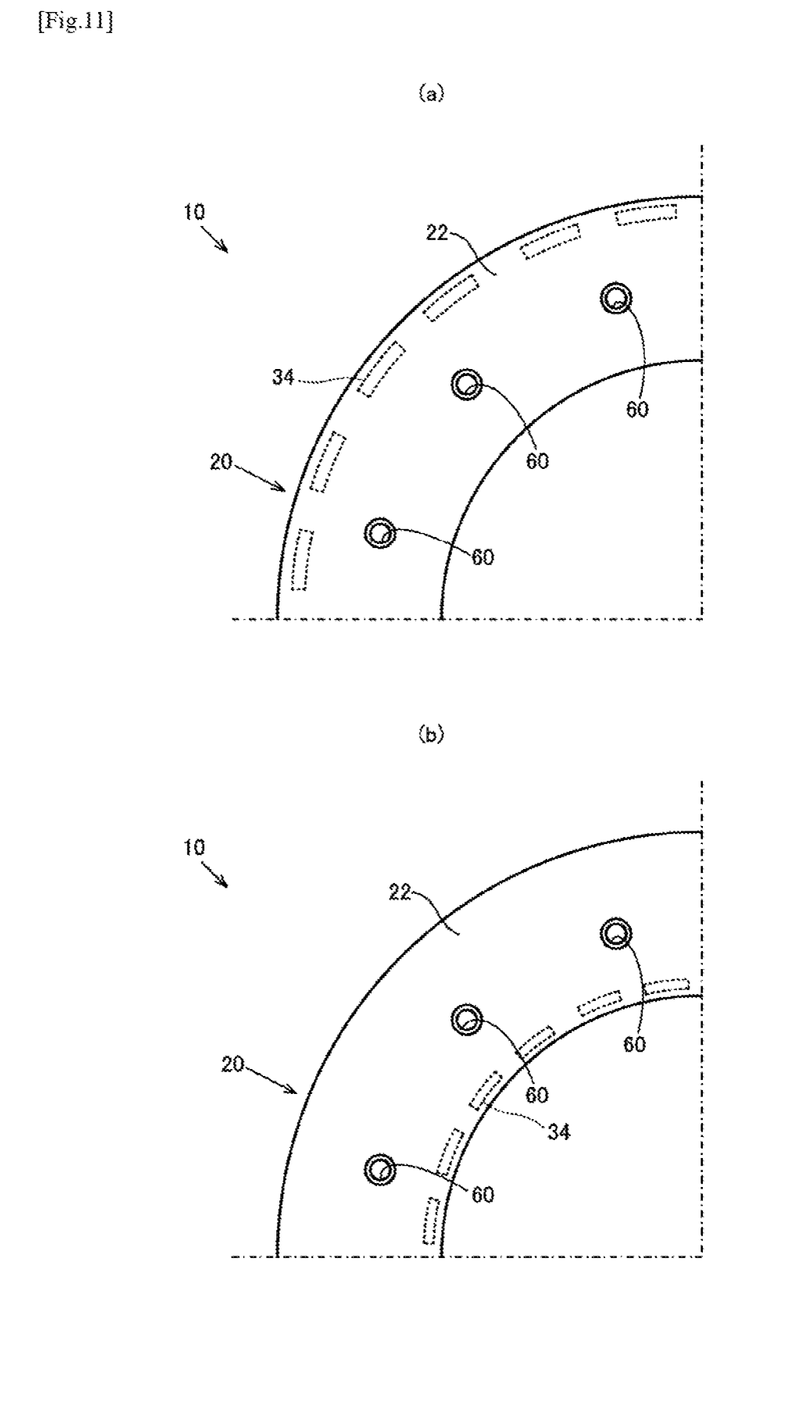
FIG. 11 illustrates other examples of the brake disk unit.

In embodiments described above, although the plurality of protruding portions 34 are provided in a center portion of the plate-like portion 22 in the radial direction, the position of the protruding portion 34 is not limited to the above example. For example, as illustrated in FIG. 11(a), the plurality of protruding portions 34 may be provided in an outer circumference of the plate-like portion 22, and as illustrated in FIG. 11(b), the plurality of protruding portions 34 may be provided in an inner circumference of the plate-like portion 22.

In embodiments described above, although description has been made as to the cases where the aerodynamic noise reduction member 30 is made of a single member that has an annular shape, the configuration of the aerodynamic noise reduction member 30 is not limited to the above example. For example, the aerodynamic noise reduction member 30 may be configured in such a manner that the aerodynamic noise reduction member 30 is divided into a plurality of members in the circumferential direction. Further, the aerodynamic noise reduction member may not necessarily have an annular shape. For example, a plurality of arcuate aerodynamic noise reduction members may be provided between the brake disk 20 and the wheel 102 in a spaced apart manner in the circumferential direction.

In embodiments described above, although description has been made as to the cases where the number of the plurality of protruding portions 34 is equal to that of the plurality of fins 24 and 26 (total of the plurality of fastening fins 24 and the plurality of anchoring fins 26), the number of the plurality of protruding portions 34 may be smaller than that of the plurality of fins 24 and 26.

In embodiments described above, although every fin has at least one of the first through hole 60 and the key way 62 formed in the fin, no first through hole 60 nor key way 62 may be formed in any fin of the plurality of fins.

In embodiments described above, although description has been made as to the cases where the brake disk unit 10 is of a wheel-mounted brake disk type, the brake disk unit 10 may be of an axle-mounted brake disk type. Specifically, the brake disk unit 10 may be fixed to a disk-shaped rotating member (disk-like object) fixed to the axle 101 separately from the wheel. The disk-like object is integrally rotatable with the axle 101 and provided coaxially with the axle 101 as with the wheel. Even when the brake disk unit 10 is of an axle-mounted brake disk type, the brake disk unit 10 is attached to the disk-like object by using fastening members and keys as with the wheel-mounted brake disk type. Note that the disk-shaped rotating member as used herein means a rotating member that includes a circular plate portion for fixing the brake disk unit 10. Accordingly, like the wheel 102 illustrated in FIG. 1, tubular portions may be provided in an inner circumference and an outer circumference of the rotating member.

INDUSTRIAL APPLICABILITY

According to the present invention, it is possible to facilitate the design of the railroad vehicle brake disk and restrain an aerodynamic noise from being generated.

REFERENCE SIGNS LIST

10 brake disk unit
12 brake lining
14 bolt
16 nut
20 brake disk
22 plate-like portion
22a sliding surface
24 fastening fin
26 anchoring fin
24a, 26a recess
30 aerodynamic noise reduction member
32 support portion
34 protruding portion
60 first through hole
62 key way
70 second through hole
72 third through hole
100 disk brake
102 rotating member (wheel)
102a circular plate portion

The invention claimed is:

1. An aerodynamic noise reduction member to be provided between a railroad vehicle brake disk and a disk-shaped rotating member rotated integrally with an axle of a railroad vehicle, the railroad vehicle brake disk including: an annular plate-like portion that has a sliding surface on a first side in a thickness direction; and a plurality of fins protruding from the plate-like portion toward a second side in the thickness direction, the plurality of fins being provided in a spaced apart manner in a circumferential direction of the plate-like portion, the aerodynamic noise reduction member comprising:
a plate-like support portion to be sandwiched between the plurality of fins and the rotating member; and
a plurality of protruding portions protruding from the support portion in a thickness direction of the support portion,
wherein in a state in which the support portion is sandwiched between the plurality of fins and the rotating member, each of the plurality of protruding portions partially occludes between adjacent ones of the fins in the circumferential direction.

2. A railroad vehicle brake disk unit comprising:
a railroad vehicle brake disk including an annular plate-like portion that has a sliding surface on a first side in a thickness direction, and a plurality of fins protruding from the plate-like portion toward a second side in the thickness direction, the plurality of fins being provided in a mutually spaced apart manner in a circumferential direction of the plate-like portion; and
the aerodynamic noise reduction member according to claim 1.

3. A railroad vehicle disk brake comprising the railroad vehicle brake disk unit according to claim 2.

4. A railroad vehicle comprising the railroad vehicle disk brake according to claim 3.

5. A railroad vehicle wheel comprising the railroad vehicle brake disk unit according to claim 2.

6. The aerodynamic noise reduction member according to claim 1, wherein
in a state in which the support portion is sandwiched between the plurality of fins and the rotating member, each of the plurality of protruding portions protrudes from the support portion to a side of the plate-like portion in such a manner that a gap is formed between the protruding portions and the plate-like portion.

7. The aerodynamic noise reduction member according to claim 6, wherein
in a section orthogonal to the circumferential direction of the plate-like portion, a leading end portion of each of the protruding portions is curved or inclined outward with respect to an axial direction of the rotating member in a radial direction of the plate-like portion.

8. The aerodynamic noise reduction member according to claim 1, wherein
the plurality of fins include a fastening fin that has a first through hole into which a fastening member is to be inserted, and
the support portion has a second through hole that faces the first through hole in a state in which the support portion is sandwiched between the plurality of fins and the rotating member.

9. The aerodynamic noise reduction member according to claim 1, wherein
the plurality of fins include an anchoring fin that has a key way recessed from an end portion on the second side in the thickness direction of the plate-like portion toward the first side, and
the support portion has a third through hole that faces the key way in a state in which the support portion is sandwiched between the plurality of fins and the rotating member.

10. The aerodynamic noise reduction member according to claim 1, wherein
in a radial direction of the plate-like portion, a length of each of the plurality of protruding portions is shorter than a length of each of the plurality of fins.

11. The aerodynamic noise reduction member according to claim 1, wherein
the support portion has a ring shape, and a number of the plurality of protruding portions is equal to that of the plurality of fins.

* * * * *